United States Patent
Chan (10) Patent No.: US 12,242,320 B2
(45) Date of Patent: Mar. 4, 2025

(54) POWER MANAGEMENT CIRCUIT AND SYSTEM THEREOF

(71) Applicant: IEI INTEGRATION CORP., New Taipei (TW)

(72) Inventor: Kai-Cheng Chan, New Taipei (TW)

(73) Assignee: IEI INTEGRATION CORP., New Taipei (TW)

( * ) Notice: Subject to any disclaimer, the term of this patent is extended or adjusted under 35 U.S.C. 154(b) by 401 days.

(21) Appl. No.: 17/359,699

(22) Filed: Jun. 28, 2021

(65) Prior Publication Data

US 2022/0276689 A1    Sep. 1, 2022

(30) Foreign Application Priority Data

Feb. 26, 2021    (TW) .................................. 110107009

(51) Int. Cl.
G06F 1/3203    (2019.01)
G06F 15/78    (2006.01)

(52) U.S. Cl.
CPC ........ G06F 1/3203 (2013.01); G06F 15/7807 (2013.01); G06F 15/7842 (2013.01)

(58) Field of Classification Search
CPC .............. G06F 1/3203; G06F 15/7807; G06F 15/7842; G06F 1/189; G06F 1/263; G06F 1/3206; G06F 15/17381; G06F 1/3287; H02J 7/0063; H01M 10/425; H01M 10/4257; H01M 2010/4271
See application file for complete search history.

(56) References Cited

U.S. PATENT DOCUMENTS

| | | | |
|---|---|---|---|
| 10,360,168 B1 * | 7/2019 | Griffin | ................ G06F 12/1027 |
| 2014/0103192 A1 | 4/2014 | Lee et al. | |
| 2018/0224393 A1 | 8/2018 | Johnson et al. | |

FOREIGN PATENT DOCUMENTS

| | | |
|---|---|---|
| CN | 108415320 | 8/2018 |
| CN | 207976832 | 10/2018 |

(Continued)

OTHER PUBLICATIONS

Taiwanese Office Action for Taiwanese Patent Application No. 110107009 dated Feb. 14, 2022.

(Continued)

*Primary Examiner* — Rexford N Barnie
*Assistant Examiner* — Thai H Tran
(74) *Attorney, Agent, or Firm* — Amin, Turocy & Watson, LLP (57) ABSTRACT

A power management circuit and system thereof are provided. The power management circuit includes M×N computing units, a first power supply unit, a second power supply unit and N−1 connection interfaces. M and N are both natural numbers greater than 1. The first power supply unit supplies power to the computing units of the Nth row, the computing units of the Nth row supply power to the computing units of the (N−1)th row, respectively, and correspondingly to computing units of subsequent rows until the computing units of the 2nd row supply power to the computing units of the 1st row, respectively. The second power supply unit supplies power to the M×N computing units, and the N−1 connection interfaces coupled to corresponding computing units of the 1st column of the M×N computing units, respectively.

11 Claims, 6 Drawing Sheets

(56) References Cited

FOREIGN PATENT DOCUMENTS

| | | |
|---|---|---|
| CN | 209151000 | 7/2019 |
| CN | 110989751 | 4/2020 |
| KR | 20190063383 | 6/2019 |
| TW | I696067 | 6/2020 |
| TW | I705444 | 9/2020 |
| WO | 2017/006512 | 1/2017 |

OTHER PUBLICATIONS

Chinese Office Action for Chinese Patent Application No. 202110538428.1 dated Mar. 29, 2024.

\* cited by examiner

POWER MANAGEMENT CIRCUIT AND SYSTEM THEREOF

CROSS-REFERENCE TO RELATED APPLICATIONS

This application claims priority to Taiwan Application Serial No. 110107009, filed on Feb. 26, 2021. The entirety of the above-mentioned patent application is hereby incorporated by reference herein and made a part of this specification.

BACKGROUND

1. Technical Field

The present disclosure relates to power management technologies, and more particularly, to a power management circuit and system thereof applicable to a two-dimensional (2D) accelerator chip (comprising a plurality of computing units).

2. Description of Related Art

In recent years, in order to improve the computing efficiency of computing chips, a large number of accelerator chips have been applied in the computing chips. However, conventional high-power power supply units cannot provide current required by the large number of accelerator chips.

Further, current accelerator chips have a one-dimensional (1D) structure, and power transmission and data transmission between the computing units are in the same direction. That is, when one of the computing units is burned or does not function, power and data transmission of the overall structure will be adversely affected, thus resulting in a transmission failure.

Furthermore, in the conventional structure, connection interfaces are not only required between the computing units in each row for power transmission and data transmission, but also required between the computing units of different rows for power transmission and data transmission. As such, the number of the connection interfaces is large, thus leading to complicated design and high cost.

In addition, due to the rapid development of semiconductor processing technologies, the operating power supply voltage of integrated circuit (IC) chips becomes lower and lower. Therefore, power management and usage efficiency of the IC chips have become an important factor to be considered in the design of the IC chips.

Therefore, there is a need to provide a high-efficiency power management circuit and system thereof so as to effectively supply power to 2D accelerator chips and greatly reduce the number of connection interfaces coupled to the 2D computing units, thus improving the power and data transmission performance and reducing the cost of the chips.

SUMMARY

The present disclosure provides a power management circuit and system thereof applicable to power management and supply for a 2D accelerator chip (comprising a plurality of computing units) so as to effectively supply power to all of the 2D computing units and greatly reduce the number of connection interfaces coupled to the 2D computing units, thereby improving the power and data transmission performance.

The power management circuit of the present disclosure comprises: M×N computing units, wherein M and N are natural numbers greater than 1; a first power supply unit for supplying power to the computing units of the Nth row of the M×N computing units, wherein the computing units of the Nth row supply power to the computing units of the (N−1)th row, respectively; a second power supply unit for supplying power to the M×N computing units; and N−1 connection interfaces coupled to corresponding computing units of the 1st column of the M×N computing units, respectively.

In an embodiment, the first power supply unit comprises a single power source for supplying power to the computing units of the 1st to Mth columns of the Nth row.

In another embodiment, the first power supply unit comprises M or less power sources for supplying power to the computing units of the 1st to Mth columns of the Nth row, respectively.

In an embodiment, the second power supply unit comprises N or less DC-DC converters or N or less low dropout voltage regulators for supplying power to the computing units of Nth to 1st rows, respectively.

In an embodiment, each of the N−1 connection interfaces comprises a unidirectional circuit for transmission to the corresponding computing unit and an another unidirectional circuit for transmission from the corresponding computing unit.

In another embodiment, each of the N−1 connection interfaces comprises a bidirectional circuit for transmission to and from the corresponding computing unit.

In an embodiment, the corresponding computing units comprise the computing units of the Nth to 2nd rows of the 1st column.

In an embodiment, one end of each of the computing units of the 1st row is coupled to ground.

In an embodiment, when any one of the M×N computing units needs I/O transmission, the second power supply unit only supplies power to said any one of the M×N computing units.

The power management system of the present disclosure comprises: M×N computing units, wherein M and N are natural numbers greater than 1; a first power supply unit for supplying power to the computing units of the Nth row of the M×N computing units, wherein the computing units of the Nth row supply power to the computing units of the (N−1)th row, respectively; a second power supply unit for supplying power to the M×N computing units; N−1 connection interfaces coupled to corresponding computing units of the 1st column of the M×N computing units, respectively; and a processor coupled to the N−1 connection interfaces.

In an embodiment, the processor is coupled to the N−1 connection interfaces through N−1 I/O terminals of a plurality of I/O terminals and another I/O terminal of the plurality of I/O terminals is directly coupled to the computing unit of the 1st column and 1st row.

In another embodiment, the processor is coupled to the N−1 connection interfaces and the computing unit of the 1st column and 1st row through a single I/O terminal.

In an embodiment, each of the N−1 connection interfaces comprises a unidirectional circuit for transmission from the processor to the corresponding computing unit and an another unidirectional circuit for transmission from the corresponding computing unit to the processor.

In another embodiment, each of the N−1 connection interfaces comprises a bidirectional circuit for transmission between the processor and the corresponding computing unit.

DETAILED DESCRIPTION

The following illustrative embodiments are provided to illustrate the disclosure of the present disclosure, these and other advantages and effects can be apparent to those in the art after reading this specification.

The present disclosure provides a power management circuit and system thereof applicable to power management and supply for a 2D accelerator chip (comprising a plurality of computing units) so as to effectively supply power to the 2D computing units and greatly reduce the number of connection interfaces coupled to the 2D computing units, thereby improving the power and data transmission performance.

Figure 1:
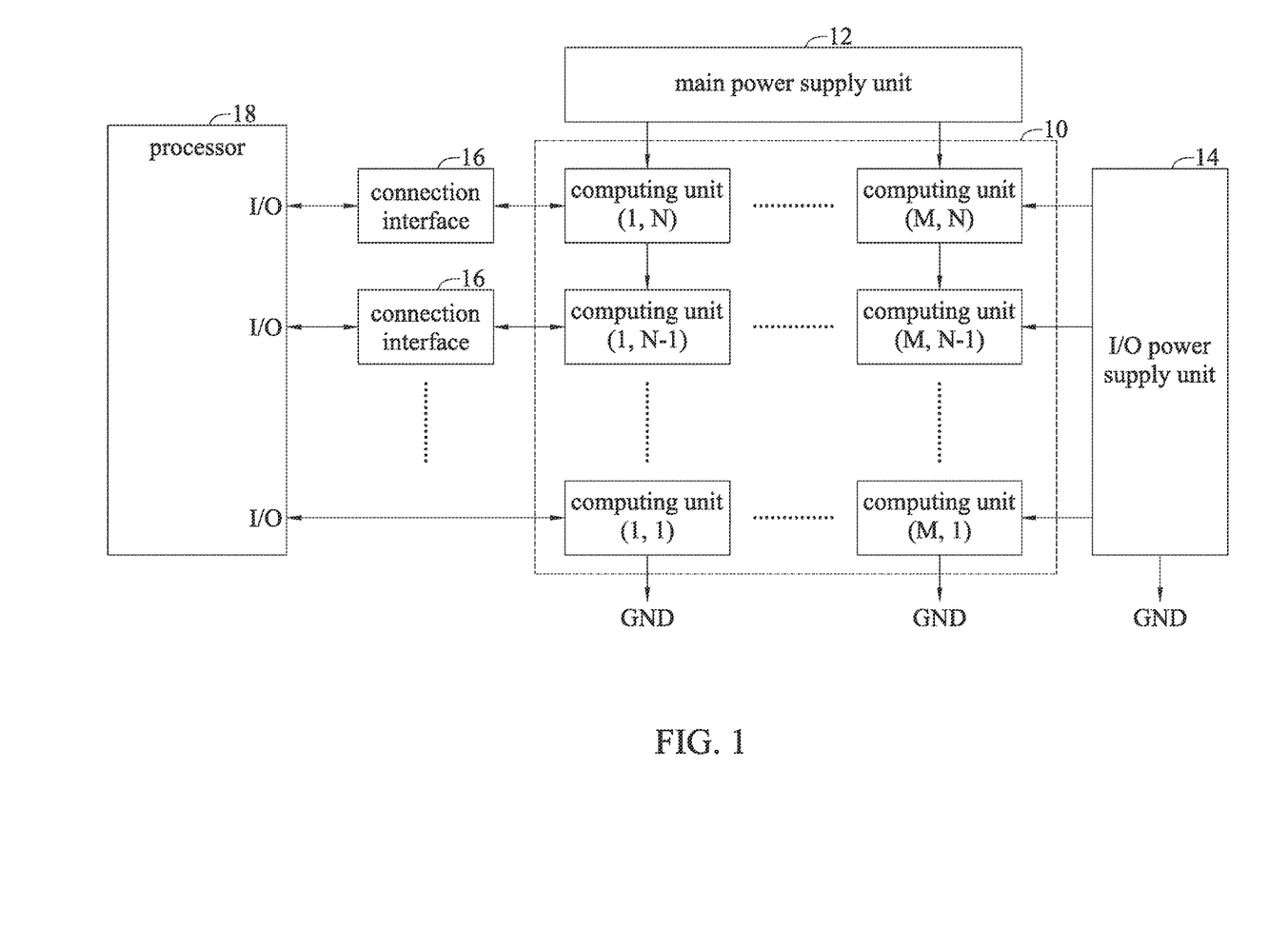
FIG. 1 is a schematic diagram of a power management circuit and system thereof according to an embodiment of the present disclosure.

FIG. 1 is a schematic diagram of a power management circuit and system thereof according to an embodiment of the present disclosure. Referring to FIG. 1, the power management circuit and system thereof at least have, but not limited to, M×N computing units 10, a main power supply unit 12 (also referred to as a first power supply unit), an I/O power supply unit 14 (also referred to as a second power supply unit), N−1 connection interfaces 16 and a processor 18.

Referring to FIG. 1, in an embodiment, the M×N computing units 10 have M columns and N rows of computing units (the present disclosure is not limited to as such). M and N are natural numbers greater than 1. The main power supply unit 12 is coupled to and supplies power to the computing units of the Nth row of the M×N computing units 10 (i.e., (1, N) to (M, N) computing units). The computing units of the Nth row are coupled to and supply power to the computing units of the (N−1)th row (i.e., (1, N−1) to (M, N−1) computing units), respectively, and so on correspondingly to computing units of subsequent rows until the computing units of the 2nd row (i.e., (1, 2) to (M, 2) computing units) are coupled to and supply power to the computing units of the 1st row (i.e., (1, 1) to (M, 1) computing units), respectively. The I/O power supply unit 14 is coupled to and supplies current to the M×N computing units 10, and the N−1 connection interfaces 16 are coupled to corresponding computing units of the 1st column of the M×N computing units, respectively. In addition, the processor 18 is coupled to the N−1 connection interfaces 16. Therein, the corresponding computing units are computing units of the Nth to 2nd rows of the 1st column (i.e., (1, N) to (1, 2) computing units).

Referring to FIG. 1, in an embodiment, the processor 18 is coupled to the N−1 connection interfaces 16 through N−1 I/O terminals of a plurality of I/O terminals (i.e., the N−1 I/O terminals of the plurality of I/O terminals are coupled to the N−1 connection interfaces 16, respectively), and another I/O terminal of the plurality of I/O terminals of the processor 18 is directly coupled to the computing unit of the 1st column and the 1st row (i.e., (1, 1) computing unit).

Further, in an embodiment, when any computing unit of the M×N computing units 10 needs I/O transmission, the I/O power supply unit 14 only supplies current (about 50 mA or less) to said any computing unit of the M×N computing units.

Furthermore, in another embodiment, one end of each of the computing units of the 1st row (i.e., (1, 1) to (M, 1) computing units) is coupled to ground.

Figure 2:
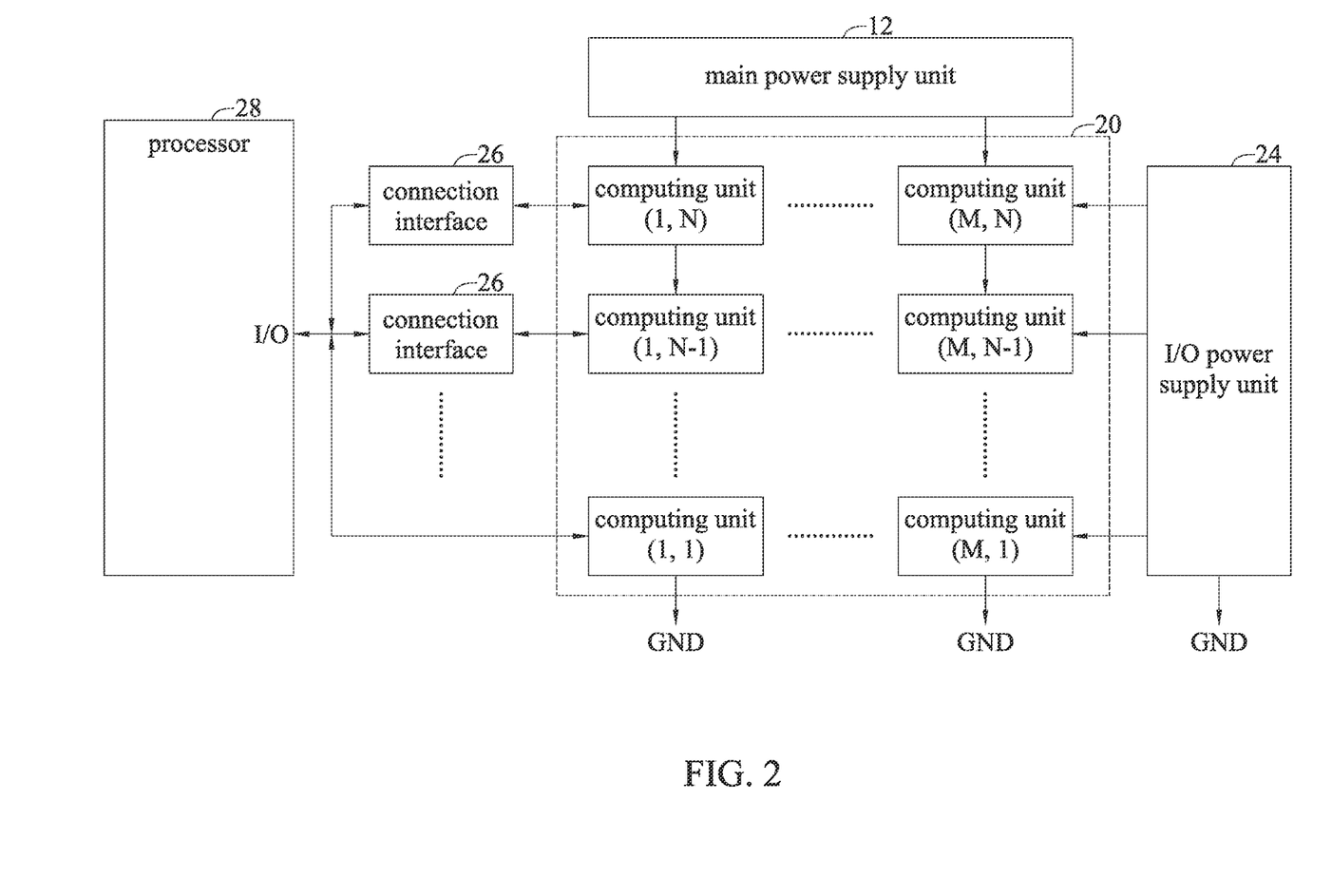
FIG. 2 is a schematic diagram of a power management circuit and system thereof according to another embodiment of the present disclosure.

FIG. 2 is a schematic diagram of a power management circuit and system thereof according to another embodiment of the present disclosure. Referring to FIG. 2, the power management circuit and system thereof at least have, but not limited to, M×N computing units 20, a main power supply unit 22 (also referred to as a first power supply unit), an I/O power supply unit 24 (also referred to as a second power supply unit), N−1 connection interfaces 26 and a processor 28.

Referring to FIG. 2, in an embodiment, the M×N computing units 20 have M columns and N rows of computing units (the present disclosure is not limited to as such). M and N are natural numbers greater than 1. The main power supply unit 22 is coupled to and supplies power to the computing units of the Nth row of the M×N computing units 20 (i.e., (1, N) to (M, N) computing units). The computing units of the Nth row are coupled to and supply power to the computing units of the (N−1)th row (i.e., (1, N−1) to (M, N−1) computing units), respectively, and so on correspondingly to computing units of subsequent rows until the computing units of the 2nd row (i.e., (1, 2) to (M, 2) computing units) are coupled to and supply power to the computing units of the 1st row (i.e., (1, 1) to (M, 1) computing units), respectively. The I/O power supply unit 24 is coupled to and supplies power to the M×N computing units 20, and the N−1 connection interfaces 26 are coupled to corresponding computing units of the 1st column of the M×N computing units, respectively. In addition, the processor 28 is coupled to the N−1 connection interfaces 26. Therein, the corresponding computing units are computing units of the Nth to 2nd rows of the 1st column (i.e., (1, N) to (1, 2) computing units).

Referring to FIG. 2, different from the embodiment of FIG. 1, the processor 28 is coupled to the N−1 connection interfaces 26 and the computing unit of the 1st column and the 1st row (i.e., (1, 1) computing unit) through a single I/O terminal.

Further, in an embodiment, when any computing unit of the M×N computing units 20 needs I/O transmission, the I/O power supply unit 24 only supplies current (about 50 mA or less) to said any computing unit of the M×N computing units.

Furthermore, in an embodiment, one end of each of the computing units of the 1st row (i.e., (1, 1) to (M, 1) computing units) is coupled to ground.

Figure 3:
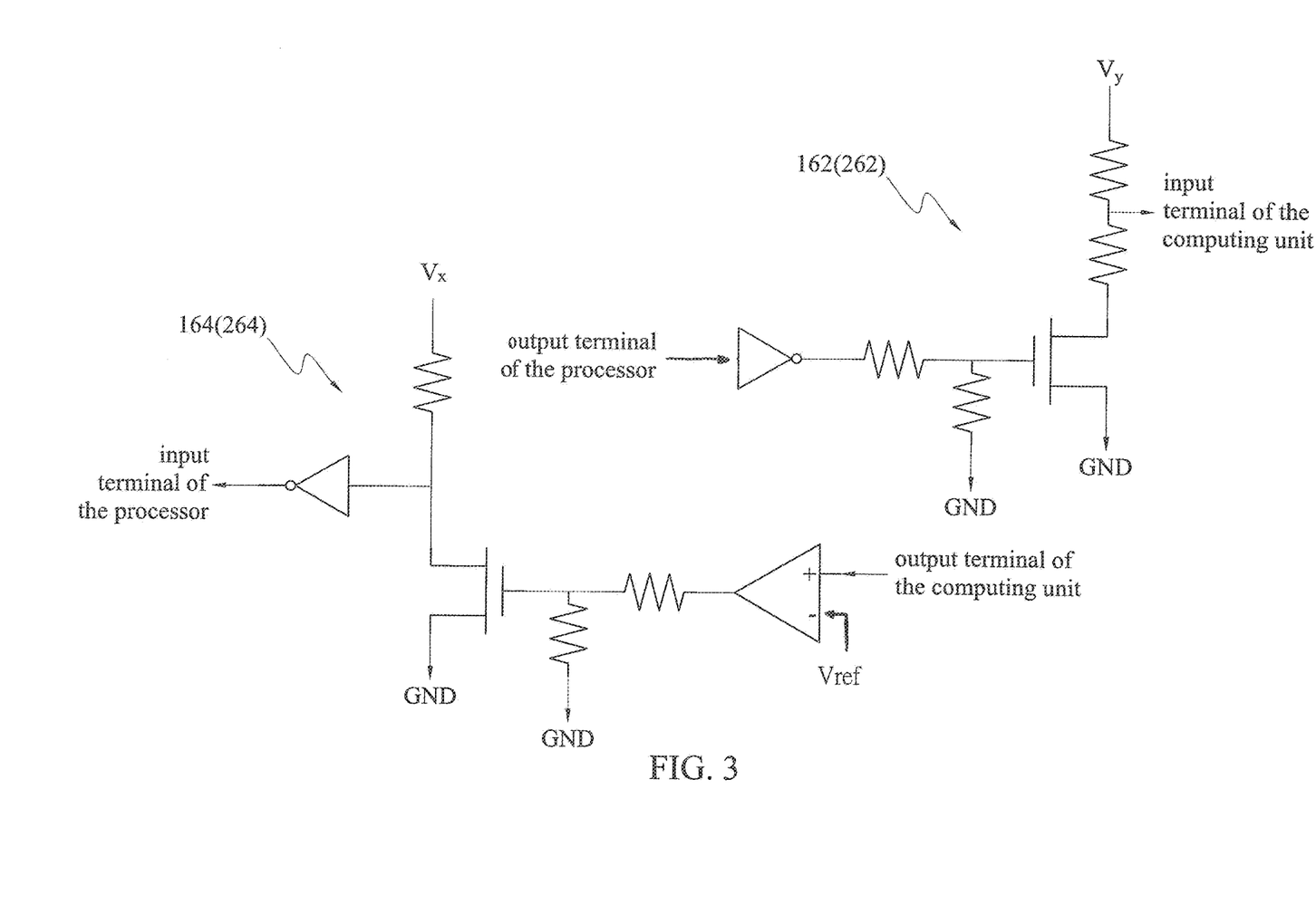
FIG. 3 is a schematic circuit diagram of connection interfaces of a power management circuit and system thereof according to an embodiment of the present disclosure.

FIG. 3 is a schematic circuit diagram of each of the connection interfaces of the power management circuit and system thereof according to an embodiment of the present disclosure. Each of the connection interfaces 16, 26 has a unidirectional circuit 162, 262 for transmission from the processor to the corresponding computing unit and a unidirectional circuit 164, 264 for transmission from the corresponding computing unit to the processor. In an embodiment, reference input voltage Vref of FIG. 3 is an intermediate value of an input voltage range. In another embodiment, Vx and Vy of FIG. 3 have different voltage levels in different rows. In yet another embodiment, GND of FIG. 3 refers to system ground.

Figure 4:
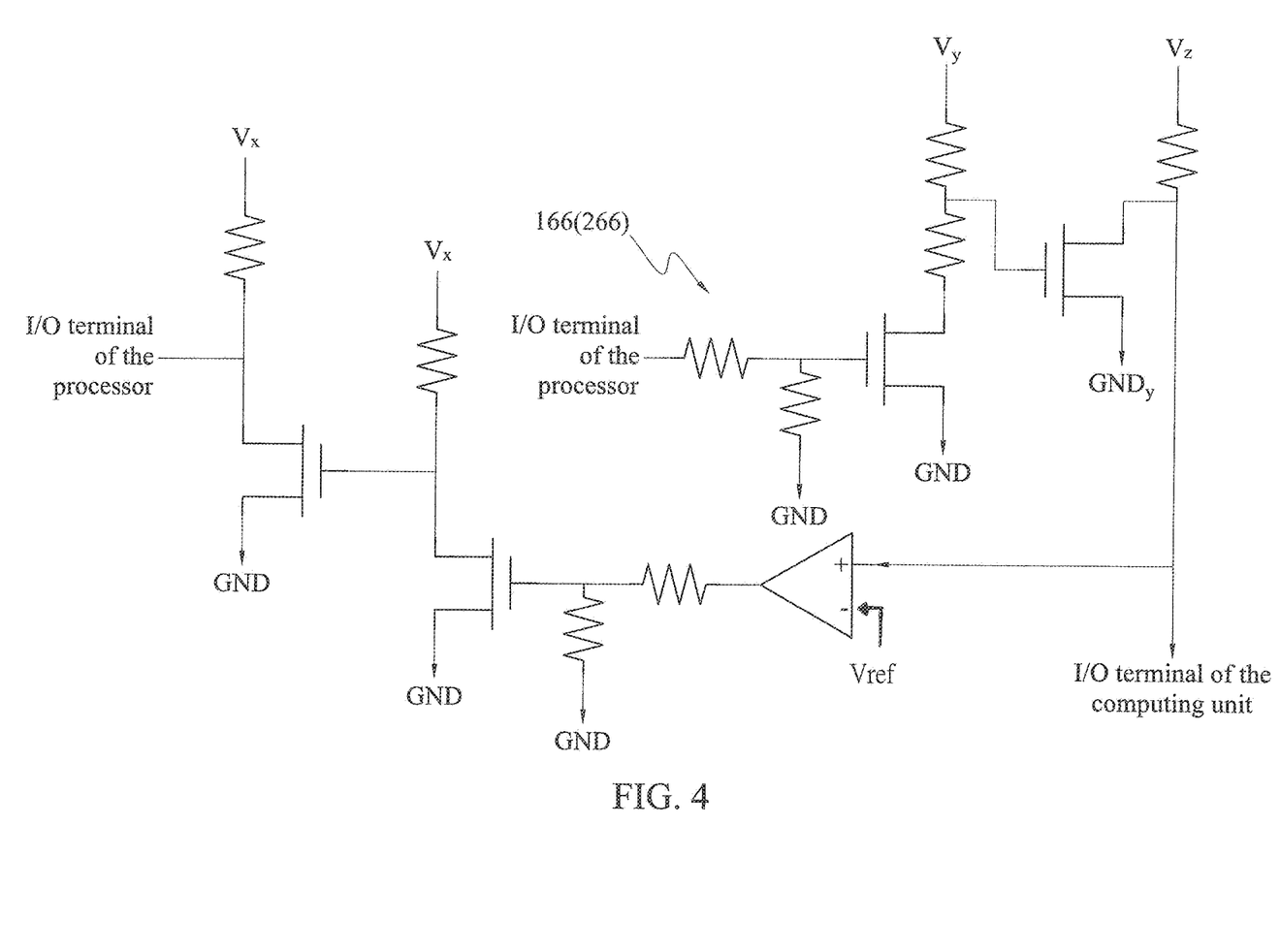
FIG. 4 is a schematic circuit diagram of connection interfaces of a power management circuit and system thereof according to another embodiment of the present disclosure.

FIG. 4 is a schematic circuit diagram of each of the connection interfaces according to another embodiment of the present disclosure. Each of the connection interfaces 16, 26 has a bidirectional circuit 166, 266 for transmission between the processor and the corresponding computing unit. In an embodiment, reference input voltage Vref of FIG. 4 is an intermediate value of an input voltage range. In another embodiment, Vx, Vy and Vz of FIG. 4 have different voltage levels in different rows. In yet another embodiment, GND of FIG. 4 refers to system ground, while GNDy of FIG. 4 refers to row ground. That is, different rows have different ground levels.

Figure 5A:
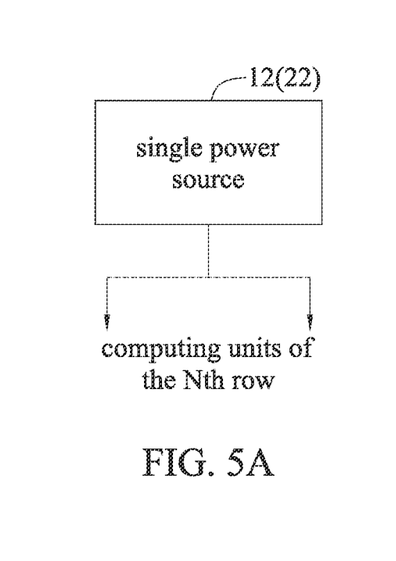
FIG. 5A is a schematic diagram of a main power supply unit having a single power source according to an embodiment of the present disclosure.

Referring to FIG. 5A, in an embodiment, the main power supply unit 12, 22 has a single power source coupled to and supplying power to the computing units of the 1st to Mth columns of the Nth row (i.e., (1, N) to (M, N) computing units).

Figure 5B:
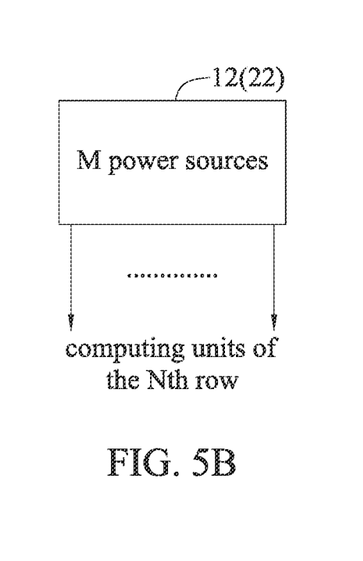
FIG. 5B is a schematic diagram of a main power supply unit having M power sources according to another embodiment of the present disclosure.

Referring to FIG. 5B, in another embodiment, the main power supply unit 12, 22 has M power sources coupled to and supplying power to the computing units of the 1st to Mth columns of the Nth row (i.e., (1, N) to (M, N) computing units), respectively.

Figure 6:
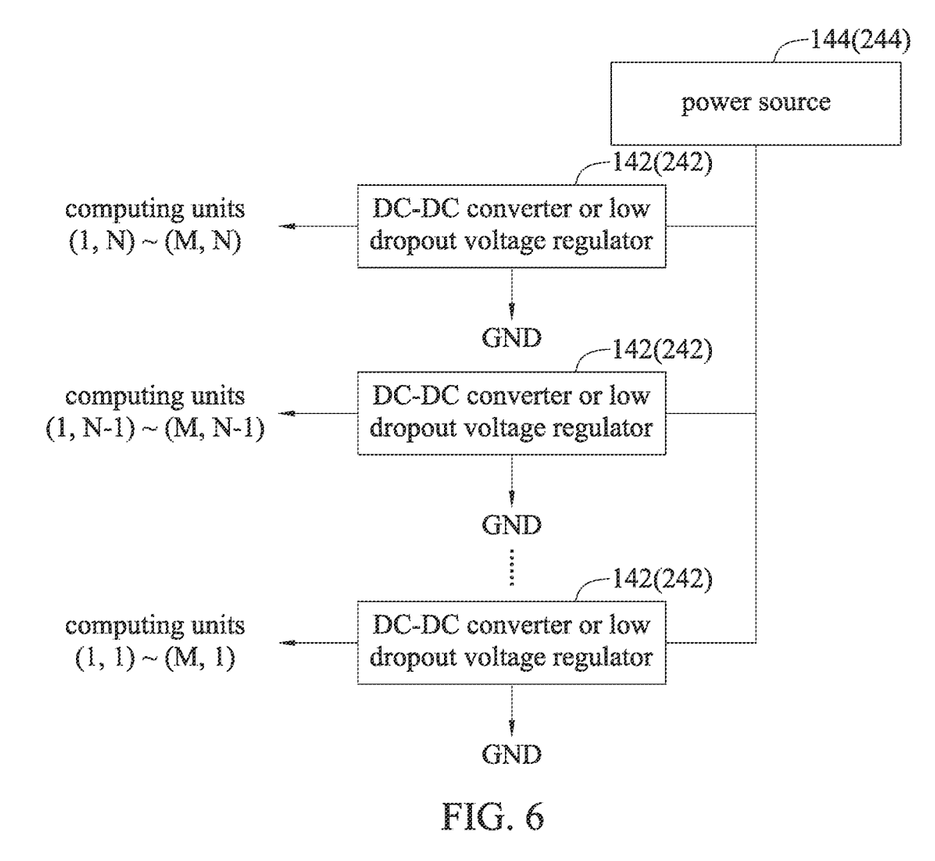
FIG. 6 is a schematic diagram of an input/output (I/O) power supply unit of a power management circuit and system thereof according to the present disclosure.

FIG. 6 is a schematic diagram of the I/O power supply unit 14, 24 (also referred as the second power supply unit) of the power management circuit and system thereof according to the present disclosure. The I/O power supply unit 14, 24 includes N direct current-direct current (DC-DC) converters 142, 242 or N low dropout voltage regulators 142, 242 that are coupled to and supply power to the computing units of the Nth to 1st rows, respectively. Further, the I/O power supply unit can have a power source 144, 244 coupled to the N DC-DC converters or N low dropout voltage regulators 142, 242.

According to the above-described embodiments of the present disclosure, the power management circuit and system thereof of the present disclosure can effectively solve the following problems: 1. the conventional high-power power supply units cannot provide current required by a large number of accelerator chips; 2. the conventional accelerator chips have a 1D structure, power transmission and data transmission between the computing units are in the same direction, when one of the computing units is burned or does not function, power and data transmission of the overall structure will fail; and 3. the conventional overall structure requires a large number of connection interfaces, thus leading to complicated design and high cost.

Therefore, the power management circuit and system thereof of the present disclosure have the following advantages: 1. the sum of current required by the computing units of M columns is less than the output current of the I/O power supply unit; 2. the sum of voltage required by the computing units of N rows is less than the output voltage of the main power supply unit; 3. data transmission can be performed between the computing units in each row without any connection interface; 4. power transmission can be performed between the computing units of different rows without any connection interface; 5. the power management system only needs N−1 connection interfaces (i.e., the computing units of each row only need one connection interface); and 6. since power transmission is in a vertical direction and data transmission is in a horizontal direction, when any one of the computing units is burned or does not function, the transmission performance of the whole chip will not be affected.

Further, the power management circuit and system thereof of the present disclosure is applicable to accelerator chips using 10 nm or less semiconductor technologies.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A power management circuit, comprising:
M×N computing units, wherein M and N are natural numbers greater than 1;
a first power supply unit for supplying power to the computing units of the Nth row of the M×N computing units, wherein the computing units of the Nth row supply power to the computing units of the (N−1)th row, respectively, and correspondingly to computing units of subsequent rows until the computing units of the 2nd row supply power to the computing units of the 1st row, respectively;
a second power supply unit for supplying power to the M×N computing units; and
N−1 connection interfaces coupled to corresponding computing units of the 1st column of the M×N computing units, respectively,
wherein each of the N−1 connection interfaces comprises a unidirectional circuit for transmission to the corresponding computing unit and another unidirectional circuit for transmission from the corresponding computing unit, or each of the N−1 connection interfaces comprises a bidirectional circuit for transmission to and from the corresponding computing unit.

2. The power management circuit of claim 1, wherein the first power supply unit comprises a single power source for supplying power to the computing units of the 1st to Mth columns of the Nth row.

3. The power management circuit of claim 1, wherein the first power supply unit comprises M or less power sources for supplying power to the computing units of the 1st to Mth columns of the Nth row, respectively.

4. The power management circuit of claim 1, wherein the second power supply unit comprises N or less DC-DC converters or N or less low dropout voltage regulators for supplying power to the computing units of the Nth to 1st rows, respectively.

5. The power management circuit of claim 1, wherein the corresponding computing units comprise the computing units of the Nth to 2nd rows of the 1st column.

6. The power management circuit of claim 1, wherein when any one of the M×N computing units needs I/O transmission, the second power supply unit only supplies power to said any one of the M×N computing units.

7. The power management circuit of claim 1, wherein one end of each of the computing units of the 1st row is coupled to ground.

8. A power management system, comprising:
M×N computing units, wherein M and N are natural numbers greater than 1;
a first power supply unit for supplying power to the computing units of the Nth row of the M×N computing units, wherein the computing units of the Nth row supply power to the computing units of the (N−1)th row, respectively, and correspondingly to computing units of subsequent rows until the computing units of the 2nd row supply power to the computing units of the 1st row, respectively;
a second power supply unit for supplying power to the M×N computing units;
N−1 connection interfaces coupled to corresponding computing units of the 1st column of the M×N computing units, respectively; and
a processor coupled to the N−1 connection interfaces, wherein each of the N−1 connection interfaces comprises a unidirectional circuit for transmission from the processor to the corresponding computing unit and another unidirectional circuit for transmission from the corresponding computing unit to the processor, or each of the N−1 connection interfaces comprises a bidirectional circuit for transmission between the processor and the corresponding computing unit.

9. The power management system of claim 8, wherein the processor is coupled to the N−1 connection interfaces through N−1 I/O terminals of a plurality of I/O terminals.

10. The power management system of claim 9, wherein another I/O terminal of the plurality of I/O terminals is directly coupled to the computing unit of the 1st column and 1st row.

11. The power management system of claim 8, wherein the processor is coupled to the N−1 connection interfaces and the computing unit of the 1st column and 1st row through a single I/O terminal.

* * * * *